Jan. 2, 1923.
C. H. STEPHENSON.
GARBAGE BUCKET.
FILED NOV. 8, 1918.
1,441,040.
2 SHEETS—SHEET 1.
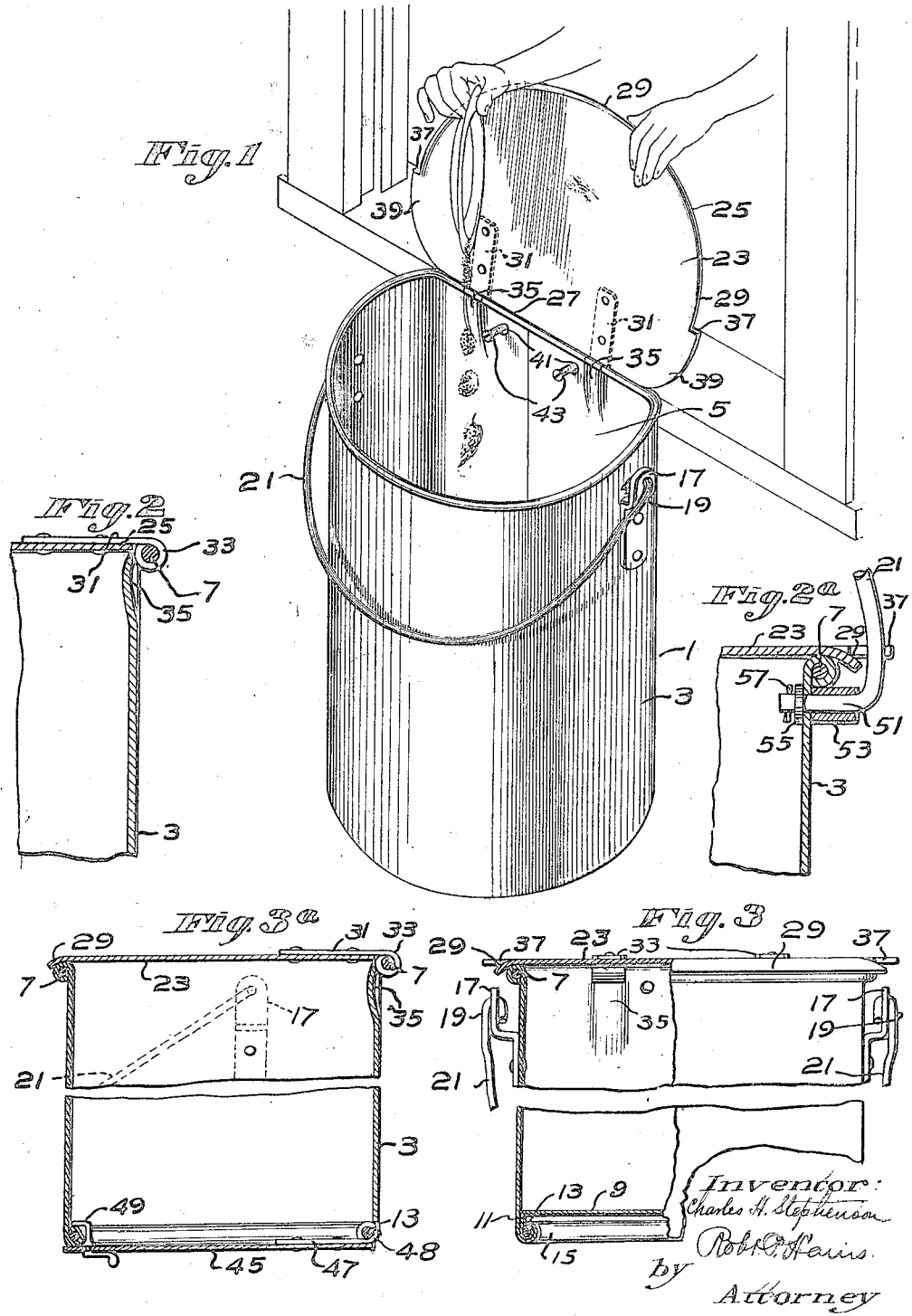

Jan. 2, 1923.
C. H. STEPHENSON.
GARBAGE BUCKET.
FILED NOV. 8, 1918.
1,441,040.
2 SHEETS—SHEET 2.
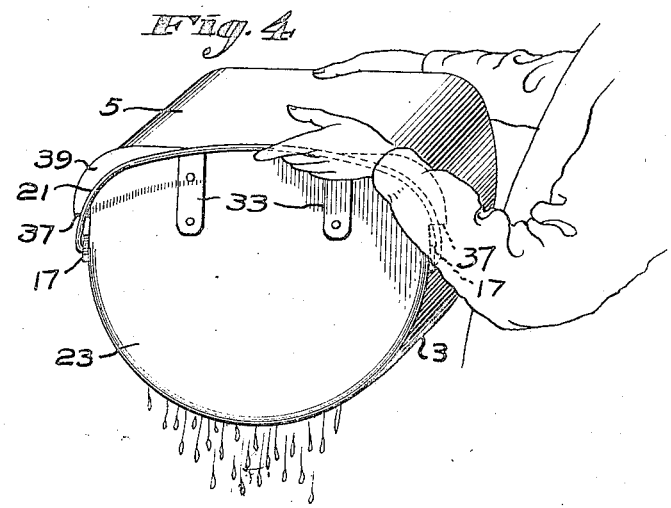
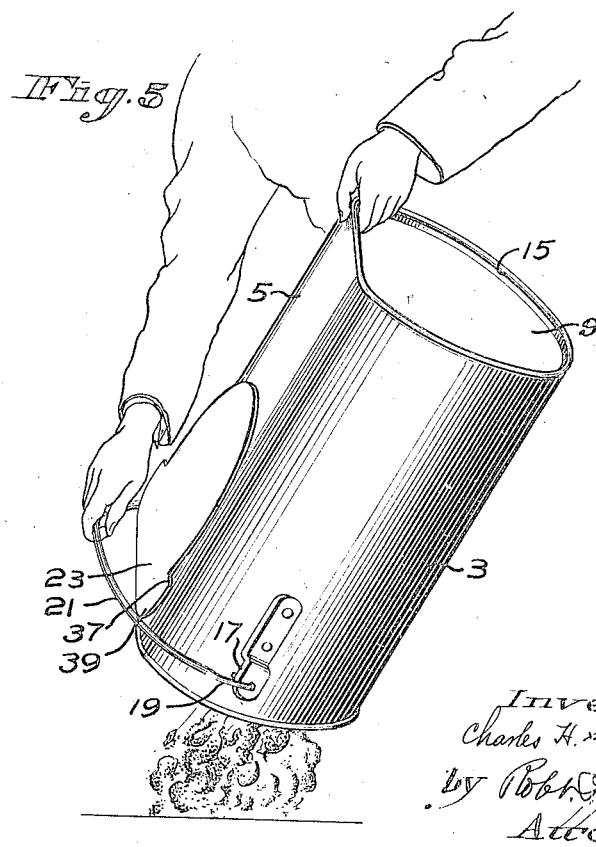
Inventor
Charles H. Stephenson,
by Robt. J. Harris
Attorney Patented Jan. 2, 1923.

1,441,040

UNITED STATES PATENT OFFICE.

CHARLES H. STEPHENSON, OF LYNN, MASSACHUSETTS.

GARBAGE BUCKET.

Application filed November 8, 1918. Serial No. 261,662.

*To all whom it may concern:*

Be it known that I, CHARLES H. STEPHENSON, a citizen of the United States, residing at Lynn, in the county of Essex and State of Massachusetts, have invented an Improvement in Garbage Buckets, of which the following description, in connection with the accompanying drawings, is a specification, like characters on the drawings representing like parts.

The invention to be hereinafter described relates to buckets for receiving garbage and other materials.

One of the objects of the invention is to provide a bucket having a body with a cover hinged thereto and a bail handle pivoted to the body, said cover and handle having parts for interengagement when the body is held in a slightly inclined position to limit opening of the cover to a small crack and permit liquids to be drained from the bucket, but prevent escape of solid matters therefrom, and said parts being adapted for interengagement in a different relation to hold the cover open and out of contact with the hands of the user when the body is further tilted to discharge the solid matters from the bucket. This feature of the invention may be carried into practical effect with an extremely simple construction which does not add materially to the cost of manufacture of the bucket.

Another object of the invention is to provide a bucket having a body with a flat side and a cover with a substantially straight edge hinged to said side, the flat side of the body of the bucket having means whereby the bucket may be readily mounted on a wall up out of reach from cats and dogs. In such use the cover when opened may serve as a shield to protect the wall from contact with garbage being dumped therein. The mounting of the bucket on the wall may be such that when the cover is open it will stand slightly forward from a vertical position so as to automatically close by gravity on release thereof.

And still another object of the invention is to provide a bucket with a hinged bottom which may readily open to discharge the contents of the bucket when desired.

The character of the invention will be best understood by reference to the following description of good forms thereof shown in the accompanying drawings, wherein:—

Fig. 1 is a perspective view of a garbage bucket embodying the invention applied to the exterior of a wall of a house beneath the sill of the window in the wall;

Fig. 2 is a vertical sectional view of a portion of the bucket showing the hinge means for connecting the cover with the body of the bucket;

Fig. 2ª is a detail of a modification to be referred to;

Fig. 3 is a view of the bucket partly in side elevation and partly in vertical section;

Fig. 3ª is a vertical section of a modified form of the bucket;

Fig. 4 is a perspective view of the bucket showing its position in draining liquid therefrom; and Fig. 5 is a perspective view of the bucket showing the position thereof when discharging solid matters therefrom.

Referring to the drawings, a bucket shown therein as one good form of the invention, comprises a body 1 which may be made of sheet material bent to present a curved side 3 and a substantially flat side 5. The upper edge portion of the body may be bent or wrapped outwardly about a reinforcing wire 7 (Fig. 3) to produce a strong upper rim. A bottom 9 may be fitted into the body and have a downwardly projecting flange 11 superposed on the lower edge portion of the body, said flange and portion being bent together about a reinforcing wire 13. The construction is such that the bottom is strongly secured to the body, and a rim 15 is provided serving as a rest for the bucket supporting the bottom upwardly from said rest and protecting said bottom. Also, this rim desirably serves as means which may be conveniently grasped by one hand of the user of the bucket in tilting the same to discharge the contents therefrom, as more fully hereinafter described.

Attached to the body adjacent the upper end thereof and preferably about midway between the front and rear thereof, are a pair of brackets 17 (Figs. 1 and 3) having eyes therein receiving hooks 19 of a bail handle 21.

The body may be provided with a suitable cover hinged thereto. In the present in-

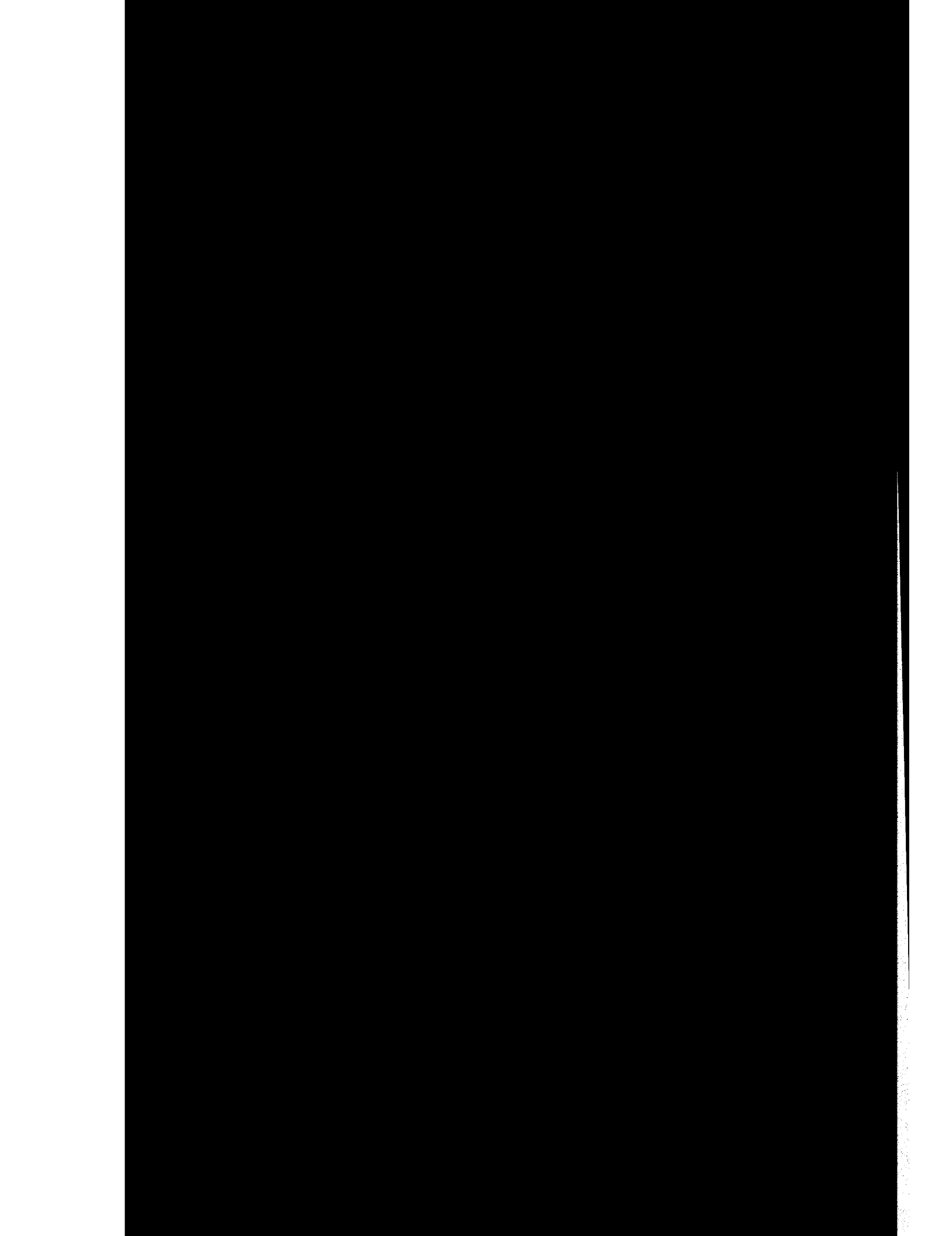

may be applied to said ends at the inner face of the curved wall. The construction is such that the ends of the bail handle after applied, are prevented from sliding in the holes in the body of the bucket, and the spacing sleeves may engage the under side of the reinforced rim so that the bail handle may lift the bucket through said rim.

In some cases it may be desirable to discharge the contents of the bucket at the bottom thereof. A form of bucket for this purpose is shown in Fig. 3ª, and is similar to the bucket already described with the exception that instead of a fixed bottom 11, a movable or swing bottom 45 is provided having hinge straps 47 riveted or otherwise secured thereto and bent to present eyes 48 receiving and adapted to swing on exposed portions of the reinforcing wire 13 at the flat side of the bottom of the bucket. A latch 49 may be provided on the bottom and adapted to engage a portion of the reinforced rim 15 opposite to the hinges. The construction is such that when the bucket is mounted on a wall or held by the hand, the latch may be readily released to allow the bottom to swing open from the weight of the material thereon and thereby discharge the material.

A bucket having a discharge bottom such as described is suitable for various uses, such for example, as in garages where it may be hung on the wall of the garage and receive oily waste. When it is desired to remove the waste, it is merely necessary to release the latch and allow the waste to discharge from the bucket.

It will be understood that the invention is not limited to the specific embodiment shown, but that various deviations may be made therefrom without departing from the spirit and scope of the appended claims.

What is claimed is:—

1. A bucket comprising a body having a flat side for firm engagement with a wall, a cover hinged to said flat side to swing from the closed position to a wide open position in which the cover extends along said flat side, a bail handle swingingly connected to said body for movement independent of the cover, and means on the cover for engagement by the bail handle whereby when the cover is closed the engagement of the bail handle with said means holds the cover in a closed position, and whereby when the cover is in the wide open position the bail handle is supported by said means to extend laterally at approximately a right angle to the longitudinal axis of the bucket.

2. A bucket comprising a body having a flat side for firm engagement with a wall, a cover hinged to said flat side to swing from the closed position to a wide open position in which the cover extends along said flat side, a bail handle swingingly connected to said body for movement independent of the cover, and projections on said cover positioned to be engaged by the bail handle when the cover is in the closed position to limit the swinging movement of the bail handle while the latter holds the cover in a slightly open position, and positioned upon movement of the cover to the wide open position to maintain the bail handle in a laterally extending position at approximately a right angle to the longitudinal axis of the bucket.

3. A bucket comprising a body having a flat side for firm engagement with a wall, a cover hinged to said flat side to swing from the closed position to a wide open position in which the cover extends along the flat side, a bail handle swingingly connected to said body for movement independently of the cover, and projecting surfaces on said cover which are positioned when the cover is closed to arrest the bail handle in a laterally-extending position to facilitate tilting of the bucket, and other projecting surfaces positioned by the cover when the latter is wide open to arrest the bail handle in a laterally-extending position to facilitate dumping the bucket.

4. A bucket comprising a body having a flat side for firm engagement with a wall, a cover hinged to said flat side to swing from closed to wide open position, a bail handle swingingly connected to the sides of said body, and a projection on said cover having opposed parts, one part positioned to be engaged by the bail handle when the cover is closed and limit opening of the cover to drain the contents of the bucket between the body and cover, and other part positioned to be engaged by the bail handle to hold the cover open to discharge the contents of the bucket.

In testimony whereof, I have signed my name to this specification.

CHARLES H. STEPHENSON.